United States Patent [19]

Shimoda

[11] Patent Number: 5,161,655

[45] Date of Patent: Nov. 10, 1992

[54] VIBRATION ENERGY ABSORBING APPARATUS

[75] Inventor: Ikuo Shimoda, Fujisawa, Japan

[73] Assignee: Oiles Corporation, Tokyo, Japan

[21] Appl. No.: 734,467

[22] Filed: Jul. 23, 1991

[30] Foreign Application Priority Data

Aug. 13, 1990 [JP] Japan .................. 2-214057
Jul. 1, 1991 [JP] Japan .................. 3-185817

[51] Int. Cl.$^5$ .............................................. F16F 7/12
[52] U.S. Cl. ...................................... 188/371; 188/268
[58] Field of Search .............. 188/371, 372, 268, 381, 188/290, 130; 267/154, 136; 248/636

[56] References Cited

U.S. PATENT DOCUMENTS

| | | | |
|---|---|---|---|
| 3,058,208 | 10/1962 | Haushalter | 188/268 X |
| 3,058,371 | 10/1962 | Haushalter | 188/268 X |
| 3,467,353 | 9/1969 | Peterson et al. | 188/268 X |
| 3,504,905 | 4/1970 | Irwin | 267/154 X |
| 3,833,093 | 9/1974 | Robinson | |
| 3,842,945 | 10/1974 | Potter | 188/268 |
| 3,953,012 | 4/1976 | Robinson | 267/154 |
| 4,480,731 | 11/1984 | Izeki et al. | 188/381 |
| 4,545,466 | 10/1985 | Izeki et al. | 188/268 |
| 4,768,761 | 9/1988 | Kramer | 267/154 |
| 5,030,490 | 7/1991 | Bronowicki et al. | 267/136 X |

FOREIGN PATENT DOCUMENTS

| | | | |
|---|---|---|---|
| 1126684 | 3/1962 | Fed. Rep. of Germany | 188/371 |
| 0012744 | 1/1977 | Japan | 188/268 |
| 0144330 | 9/1982 | Japan | 188/381 |
| 2-26332 | 1/1990 | Japan . | |
| 2-85043 | 7/1990 | Japan . | |
| 2-85045 | 7/1990 | Japan . | |
| 2-105456 | 8/1990 | Japan . | |
| 2-105457 | 8/1990 | Japan . | |
| 2-105458 | 8/1990 | Japan . | |
| 3-338 | 1/1991 | Japan . | |
| 3-51543 | 3/1991 | Japan . | |
| 3-56734 | 3/1991 | Japan . | |

OTHER PUBLICATIONS

Structural Mechanics in Reactor Technology, Aug. 1989, vol. K2 Seismic Response Analysis & Design-Kennedy et al., pp. 733-737.

*Primary Examiner*—Robert J. Oberleitner
*Assistant Examiner*—Peter M. Poon
*Attorney, Agent, or Firm*—Nixon & Vanderhye

[57] ABSTRACT

An energy absorption apparatus disposed between a pair of structures which are movable relative to each other, comprising a first operating member connected to one of the structure, a second operating member connected to the other structure, and a plastic deformation member made of a superplastic material provided between the first and second operating member and subjected to plastic deformation depending on a relative movement between the first and second operating member, and a combining layer provided between the one operating member and the plastic deformation member and having a plastic yield stress larger than the plastic deformation member, the bonding strength between the combining layer and the plastic deformation member being larger than the plasticity yield stress of the plastic deformation member.

7 Claims, 8 Drawing Sheets

VIBRATION ENERGY ABSORBING APPARATUS

BACKGROUND OF THE INVENTION

The present invention relates to vibration energy absorbing apparatus which absorbs vibration energy such as is produced by wind and/or earthquake in structures such as buildings using a plastic deformation of superplastic material used in the apparatus.

A lead plasticity energy absorbing apparatus using the plastic deformation of lead is known, for example, in Japanese Patent Application laying open No. Sho 48-72941 corresponding to U.S. Pat. No. 3,833,093 and Patent Application laying open No. Hei 2-26332.

According to the former conventional technique, the lead plasticity energy absorbing apparatus includes a cylinder, a rod inserted in the cylinder, and lead enclosed in the space between the cylinder and the rod. When the rod moves relative to the cylinder, the lead passes by radially inward raised portions or reduced inner diameter portions formed on the inner wall of the cylinder and is plastically deformed. By energy consumption on the plastic deformation, the periodic vibration energy is absorbed.

According to the latter prior art, the lead plasticity energy absorbing apparatus includes a hermetically sealed container which has an operating chamber which in turn contains lead and means for preventing the rotation of the enclosed lead, and a shaft which extends through the container of the operating chamber and has raised portions or resistance wings within the operating chamber. The sealed container and the shaft with resistance wings are connected to the corresponding structures which are movable relative to each other such that the container is rotated around the shaft through a link mechanism which converts the relative movement or displacement between the structures to a rotational movement.

Any of these conventional arrangements expects energy absorption by plastic deformation of the lead due to the movement of the raised portions moved in conjunction with the relative displacement of structures.

As a result of study of the characteristics of the conventional energy absorbing apparatus, the applicants have found that since the energy absorbing apparatus employs an arrangement which absorbs energy due to plastic deformation of lead, the axial force acting on the rod in the former case and the torque of the shaft with the wings or fins in the latter case tend to increase compared to respective expected values as well as the axial force or the torque fluctuates and the energy absorbing performance for small amplitude vibrations tends to be greatly reduced.

It was found in these prior art arrangements that when the raised portions plastically deform the lead, the lead is raised ahead of the raised portions in the direction of forward movement to thereby increase the torque on the shaft and that a spacing is formed at the lead behind the raised portions and acts as a dead zone which would impair stabilization of the energy absorption characteristic.

SUMMARY OF THE INVENTION

The present invention has been made on the basis of the above findings. It is an object of the present invention to provide an energy absorbing apparatus which realizes a pure shearing deformation of super plastic material to eliminate the causes of fluctuations in the energy absorption to stabilize the same and provide energy absorption performance in the small amplitude vibration range.

In order to achieve the above object, the present invention provides an energy absorption apparatus disposed between a pair of structures which are movable relative to each other, comprising a first operating means connected to one of the structures, a second operating means connected to the other structure, at least one of the first and second operating means having a raised portion on a surface thereof opposite to the other operating means, a plastic deformation member made of a superplastic material provided between the first and second operating means and subjected to plastic deformation depending on a relative displacement between the first and second operating means, a combining layer provided between the one operating means and the plastic deformation member and having a plastic yield stress larger than the plastic deformation member, the bonding strength between the combining layer and the plastic deformation member being larger than the plasticity yield stress of the plastic deformation member.

When there occurs a relative displacement between the first and second operating means due to a relative movement between the structures, the relative movement is transmitted through the combining layer to the plastic deformation member.

The combining layer has a plastic yield stress larger than the plastic deformation member which is made of the super-plastic material, and the bonding strength between the combining layer and the plastic deformation member is larger than the plastic yield stress of the plastic deformation member. Therefore, raising of lead and the formation of a spacing at the combining layer do not occur. The relative displacement is intactly transmitted to the plastic deformation member to thereby cause a pure shearing plastic deformation in the plastic deformation member. By consumption of energy due to the pure shearing plastic deformation of the plastic deformation member, the relative displacement between the structures is rapidly attenuated.

An energy absorption apparatus according to the present invention will be described with reference to preferred embodiments thereof shown in the accompanying drawings. This will clarify the above-mentioned invention and the advantages thereof as well as other inventions and the advantages thereof. However, the present invention is not restricted to those embodiments.

DETAILED DESCRIPTION OF THE PREFERRED EMBODIMENTS

Figure 1:
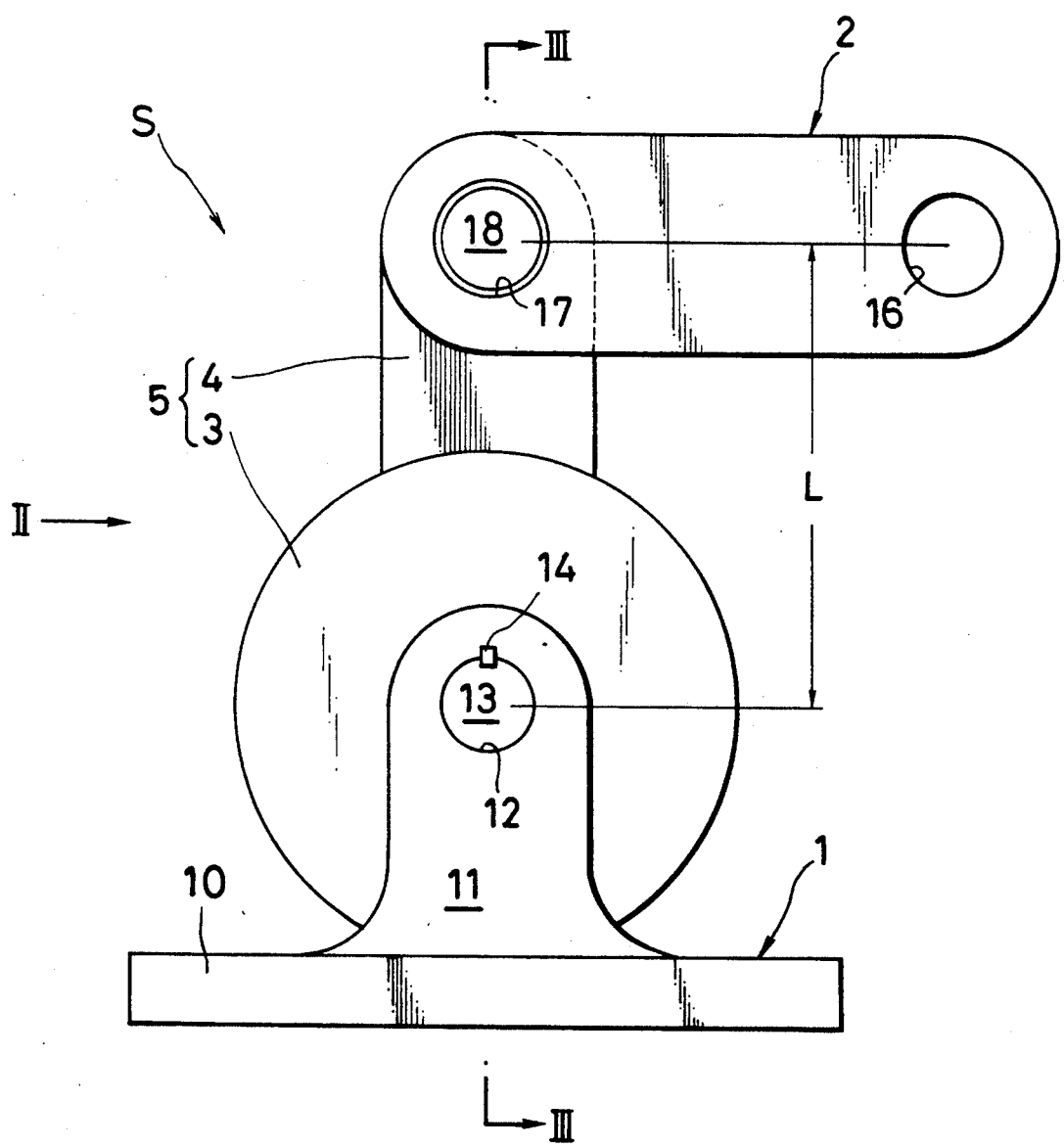
FIG. 1 is a front view of a preferred embodiment of the energy absorption apparatus according to the present invention.
Figure 2:
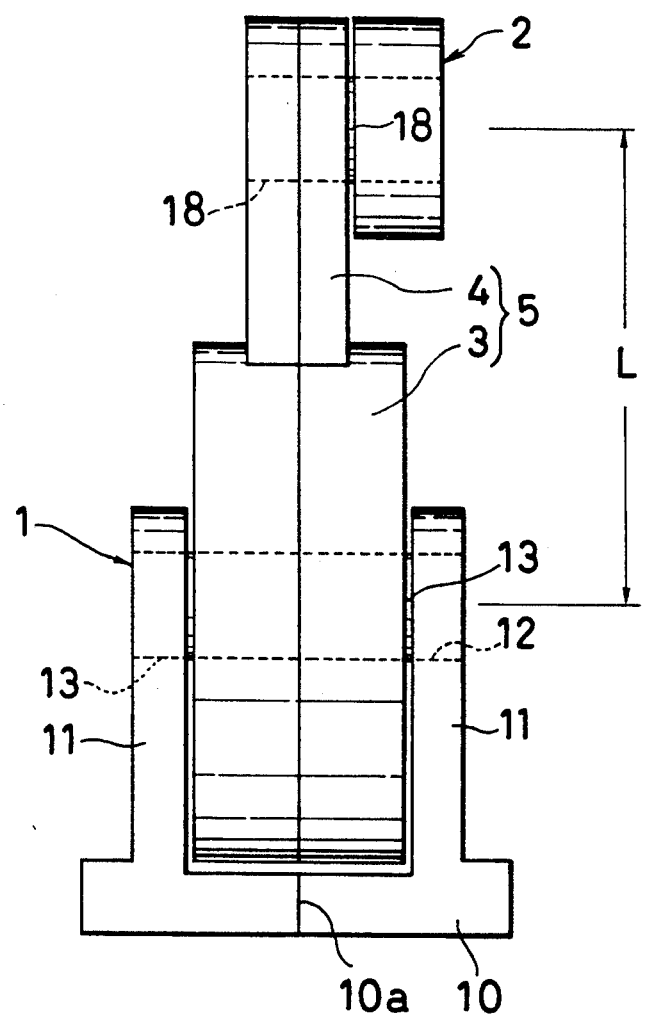
FIG. 2 is a side view of the apparatus viewed in the direction of arrow II.
Figure 3:
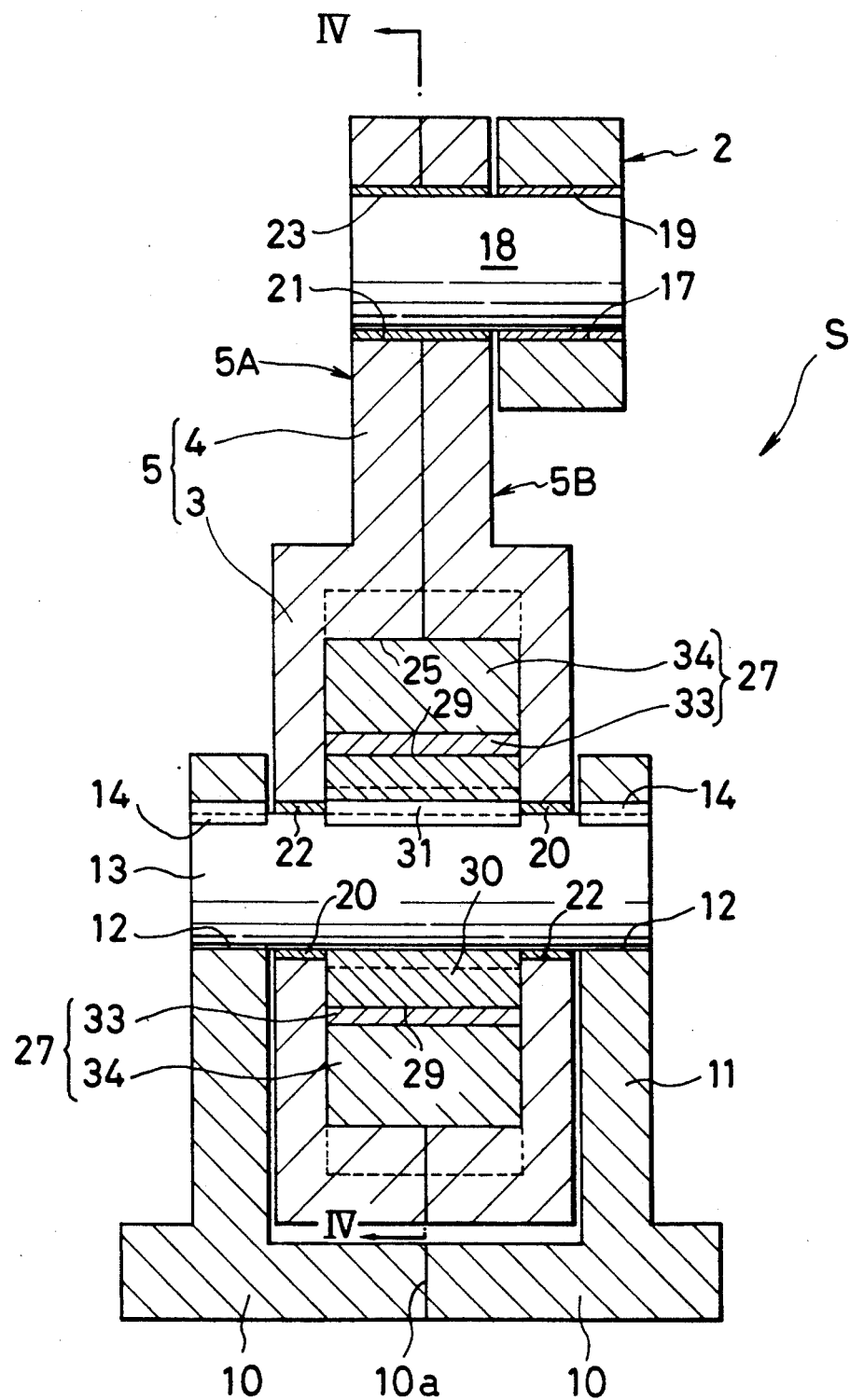
FIG. 3 is an enlarged cross-sectional view taken along the line III—III of FIG. 1.
Figure 4:
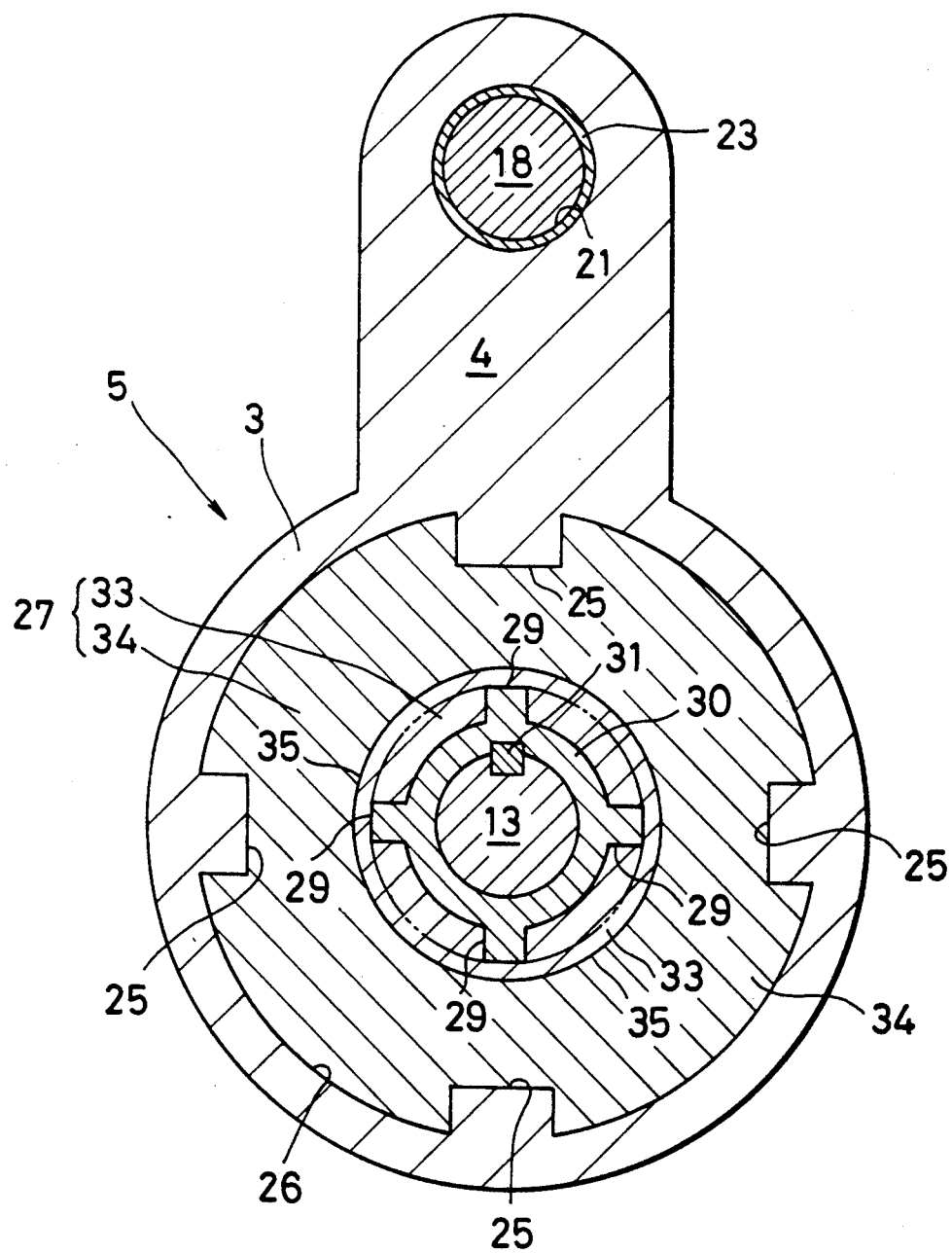
FIG. 4 is a cross-sectional view taken along the line IV—IV of FIG. 3.

Referring to FIGS. 1-4, an energy absorption apparatus S according to the present invention includes a first and a second mount 1 and 2, and a rotator 5 as first operating means including a main portion 3 and an arm 4 disposed between the mounts 1 and 2.

The first mount 1 includes a base 10, a pair of opposing upstanding supports 11 integral with the base 10 and spaced from each other by a predetermined distance. The supports 11 have aligning holes 12 through which an operating shaft 13 extends. The operating shaft 13 is fixed securely in the holes 12 with the supports 11 by means of a key 14 disposed therebetween so as to prevent the relative rotation between the shaft 13 and the supports 11. The base 10 is originally bisected at position 10a in order to facilitate the assembling of the energy absorbing apparatus S, and joined at position 10a by welding after assembling.

The second mount 2 takes the form of a strip-like plate and has holes 16 and 17 on the each end thereof, the hole 17 rotatably receiving a connection shaft 18 through a bearing bushing 19.

The main portion 3, through which shaft 13 extends, takes the form of a hermetic container fully filled with lead. The arm 4 has the connection shaft 18 extending therethrough. The rotator 5 is supported rotatable between the first and second mounts 1 and 2.

More specifically, the rotator 5 is bisected into members 5A and 5B along a rotational surface perpendicular to the axis of the operating shaft 13. The main portion 3 has a hole 20 which receives the operating shaft 13 through a bushing 22 while the arm 4 has a hole 21 which receives the connection shaft 18 through a bush 23. The holes 20 and 21 are spaced from each other by a distance of L.

The opposing members 5A and 5B of the rotator 5 are joined to each other to form the operating chamber 27 defined by a pair fo symmetrical substantially circular pan-like recesses 26 formed on the opposing surfaces of the members 5A and 5B and four equi-spaced raised portions 25 provided along the inner peripheral surfaces of the recesses 26. Therefore, the operating chamber 27 is a cylindrical hermetic space.

An operating member 30 with equi-spaced radial protrusions 29 is fitted fixedly over the operating shaft 13 within the operating chamber 27. In the present embodiment, the operating member 30 is fixed to the operating shaft 13 through a key 31, but any other conventional fixing means may be used instead. The protrusions 29 and operating member 30 are substantially equal in width to the operating chamber 27 without any spacing formed therebetween. The operating shaft 13, protrusions 29 and operating member 30 construct a second operating means in the present embodiment.

Formed around the operating member 30 is a combining layer 33 of Pb-Sn alloy having a predetermined thickness. A plastic deformation member 34 made of lead which is one of the superplastic materials is enclosed hermetically around the outer periphery of the combining layer 33 within the operating chamber 27 so as to engage the raised portions 25 formed on the inner periphery of the operating chamber 27.

While in the present embodiment lead was used as a specified one of the superplastic materials, any one of other superplastic materials, for example, metal material which exhibits superplasticity such as a Pb alloy, Sn alloy, Ag alloy, Al alloy, Cu alloy, Zn alloy and the like, and which have a recrystallizing temperature at ordinary temperature may be used. The combining layer 33 made of Pb-Sn alloy itself has a plasticity yield stress larger than the plastic deformation member 34 which is made of Pb and is joined to the plastic deformation member 34 with a bonding strength larger than the plastic yield stress of lead. For Pb-Sn alloy which can join to the plastic deformation member 34 with such large bonding strength and has a plasticity yield stress larger than lead, the content of Sn is preferably 30% or more, and more particularly, a preferred alloy is Pb -60Sn alloy. The Pb-Sn alloy preferably has twice as large plasticity yield stress as lead.

While in the present embodiment the plasticity deformation member 34 is shown as being made of Pb and the combining layer 33 is shown as being made of Pb-Sn alloy, the combining layer 33 may be made of an alloy applicable to the plasticity deformation member 34 and having a plasticity yield stress larger than the plasticity deformation member 34. For example, if the plasticity deformation member 34 is made of Pb-Sn alloy or the like, as mentioned above, the combining layer 33 may be made of an alloy of the same kind as the Pb-Sn alloy or the like and having a plasticity yield stress larger than the Pb-Sn alloy or the like.

For example, if the plasticity deformation member 34 is made of Al-33Cu-7Mg alloy, the combining layer 33 is preferably made of Al-4Cu-0.5Mg alloy. If the plasticity deformation member 34 is made of Cu-15Ni-37.5Zn alloy, the combining layer 33 is preferably made of Cu-8Sn-0.03P alloy. The combining layer 33 may be also made of a metal itself which is the main component of the alloy which forms the plasticity deformation member 34, instead of the alloy. For example, if plasticity deformation member 34 is made of Zn-22Al-4Cu alloy, the combining layer 33 may be made of an Zn metal material.

One example of method for joining the combining layer 33 to the plasticity deformation member 34 with a bonding strength larger than the plasticity yield stress of the plasticity deformation member 34, may include step for pouring a material for forming the combining layer 33, for example, melted Pb-Sn alloy into the space between the operating member 30 and the plasticity deformation member 34, and for then cooling the material to form the combining layer 33. By forming the combining layer 33 with such method, a new alloy layer is formed at a boundary 35 between the combining layer 33 and the plasticity deformation member 34, so that the required combining layer 33 is disposed between the operating member 30 and the plasticity deformation member 34. It is to be noted that when the melted material for forming the combining layer is poured, the plasticity deformation member 34 is preferably heated beforehand.

The combining layer 33 is required to have a thickness covering the top of the protrusions 29. In other words, the combining layer 33 is required to be filled so as to extend outwardly beyond an enveloping circle inscribing the top surfaces of the protrusions 29 as shown by the dot-dot-dashed line in FIG. 4.

The combining layer 33 and the plasticity deformation member 34 are combined with the boundary surface 35 therebetween and the bonding strength therebetween exhibits the characteristic mentioned above.

The energy absorbing apparatus S, thus constructed, is disposed through the first and second mounts 1 and 2 between the structures which are displaceable relative to each other. In greater detail, the first mount 1 is fixedly attached to one structure while the second mount 2 is rotatably attached to another structure through the hole 16. Thus, the second mount 2 receives the displacement from the structure concerned in the longitudinal direction thereof to thereby impart a torque to the rotator 5.

The operation of the energy absorption apparatus S of the present embodiment will be described hereinafter.

When a periodic forced vibrating force caused, for example by an earthquake, acts on a structure, the second mount 2 is displaced in the longitudinal direction thereof and the rotator 5 is rotated around the operating shaft 13 through a link mechanism comprising the second mount 2, the connecting shaft 18, and the arm 4 of the rotator 5.

By this rotation, the outer periphery of the plasticity deformation member 34 in the operating chamber 27 of the rotator 5 is prevented from slippage by the raised portions 25 formed on the inner peripheral surface of the operating chamber 27 and thus the plasticity deformation member 34 is rotated together with the rotator 5 as an unit.

Since the operating member 30 and the combining layer 33 are stationary, the plasticity deformation member 34 and the combining layer 33 are moved relative to each other in the operating chamber 27 to thereby cause the plasticity deformation member 34 to be subjected to pure shearing plasticity deformation.

Since the shearing stress exerted on the enveloping circle inscribing the top surfaces of the raised portions 25 in the operating chamber 27 is small compared to the shearing stress acting on the vicinity of the boundary surface 35 between the combining layer 33 and the plasticity deformation member 34, neither a rise in the lead nor a spacing is generated at the raised portions 25 to thereby exhibit a stabilized energy absorption characteristic. This derives from the radius of the enveloping circle inscribing the top surfaces of the raised portions 25 with the axis of the shaft 13 as the center being large compared to the radius of a circle passing through the vicinity of the boundary surface 35 between the combining layer 33 and the plasticity deformation member 34 with the axis of the shaft 13 as the center of the latter circle. Therefore, if in the present embodiment the ratio in radius of the enveloping circle involving the top surfaces of the raised portions 25 to the enveloping circle involving the boundary surface 35 between the combining layer 33 and the plasticity deformation member 34 is close to 1 (unity) and a rise in the lead and a spacing seem to occur at the raised portions 25, additional combining layers may be provided between the raised portions 25 and the plasticity deformation member 34 in the light of the concept of the present invention.

Thus, energy consumption due to pure shearing plasticity deformation of lead in the plasticity deformation member 34 attenuates the rotational motion of the rotator 5 and hence relative displacement between the structures.

While the displacement is periodic and hence the rotator 5 is periodically rotated, the periodic rotational motion of the rotator 5 is rapidly attenuated by energy consumption due to the pure shearing plasticity deformation of the lead.

In the present embodiment S, no dead zones are generated around the protrusions 29 due to the combining layer 33 and pure shearing deformation is realized in the plasticity deformation member 34. Therefore, stabilized energy absorption characteristic is exhibited. Since the boundary surface 35 ensures the reliable transmission of a deformation stress to the plasticity deformation member 34, the energy absorption performance on the small amplitude vibration is improved. By properly changing the arm length L between the operating shaft 13 and the connection shaft 18, a required moment enough to cause shearing deformation of the lead is obtained.

While in the present apparatus S the combining layer 33 has been shown as having a thickness enough to cover the protrusions 29, it may be thinned so as to coincide with the top surfaces of the protrusions 29. While the operating chamber 27 is shown as being a cylindrical space with raised portions 25 formed on the inner peripheral chamber wall, means for preventing slippage between the plasticity deformation member 34 and the inner peripheral chamber wall defining the chamber 27 such as engaging means comprising prismatic inner peripheral walls, which defines the chamber 27 may be provided instead of the raised portions 25.

A further preferred embodiment of the present invention will now be described with reference to FIGS. 5-7.

Figure 5:
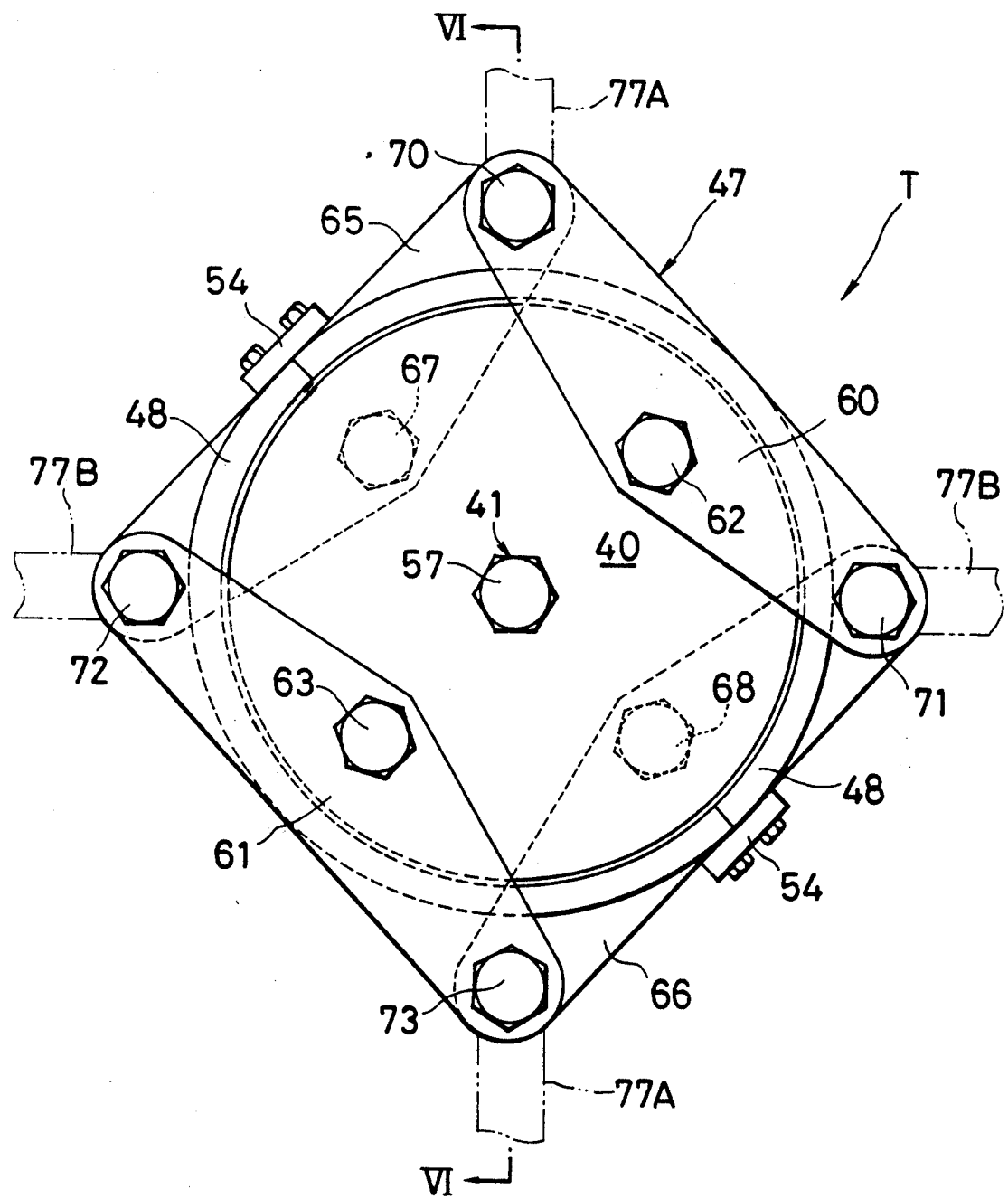
FIG. 5 is a front view of a further preferred embodiment.
Figure 6:
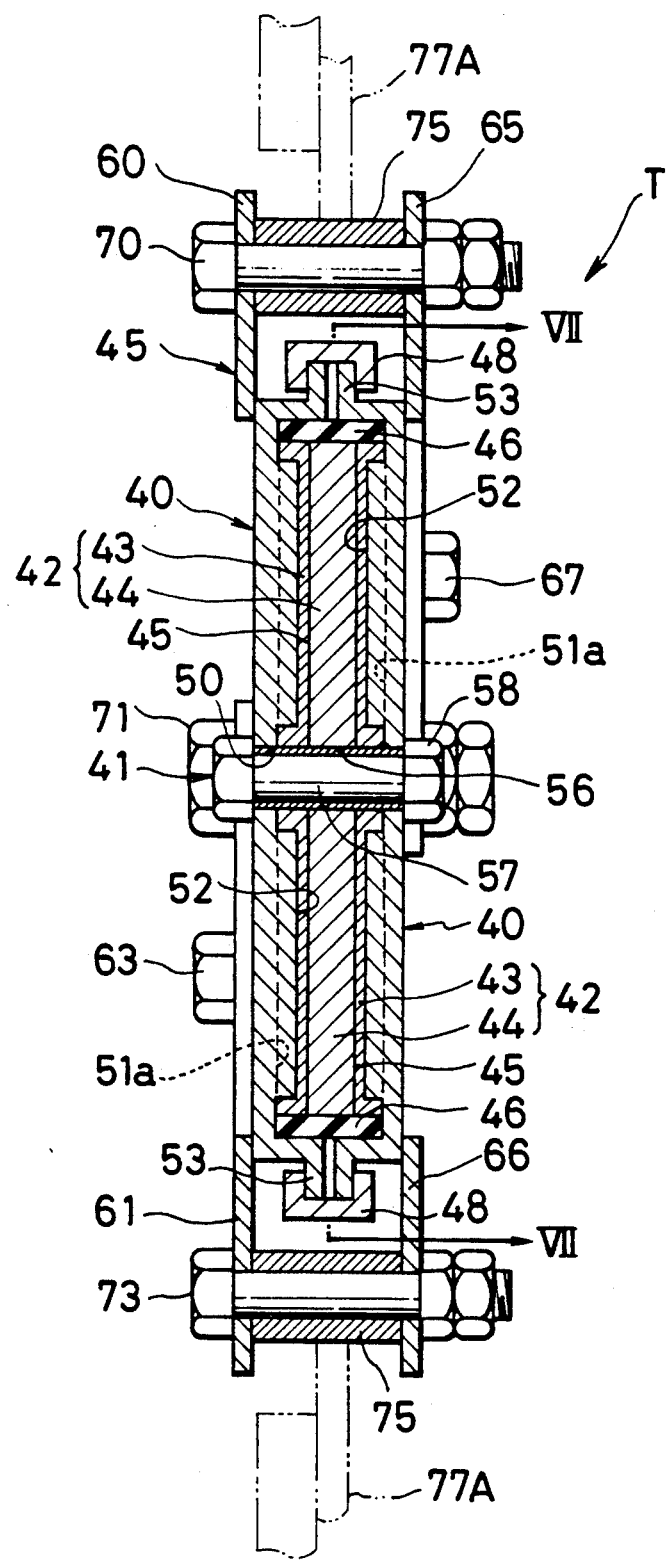
FIG. 6 is a cross-sectional view of the further embodiment taken along the line VI—VI of FIG. 5.
Figure 7:
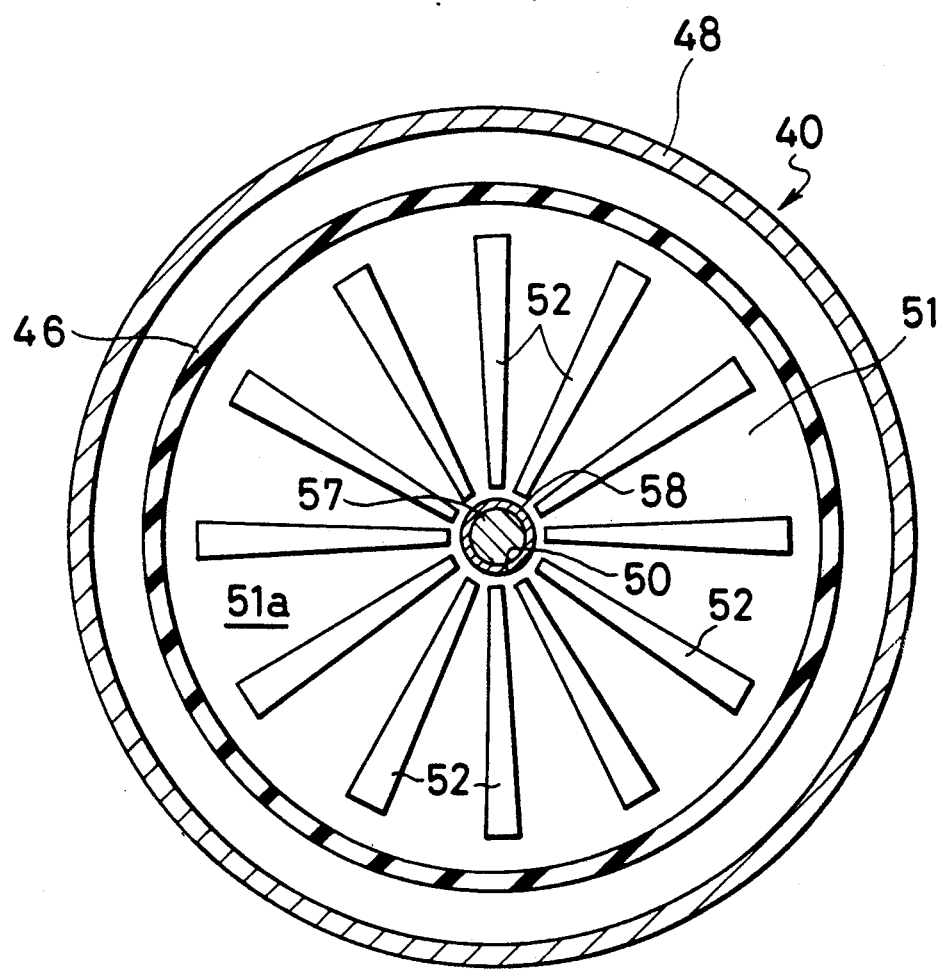
FIG. 7 is a cross-sectional view of the further embodiments taken along the line VII—VII of FIG. 6.

In FIGS. 5-7, an energy absorption apparatus T includes, as main elements, a pair of opposing rotators 40, a shaft 41 which maintains the rotational centers of the rotators 40, an operating chamber 42 formed between the rotators 40, a plastic deformation member 44 filled through a combining layer 43 into the chamber 42 and a rubber or elastic ring 46 surrounding the outer periphery of the plasticity deformation member 44, and further includes a link mechanism 47 which rotates the pair of rotators 40 in opposite directions against each other, and a connection ring 48 which fits over the rotator 40 to hold same. The rotators 40 constitute the first and second operating means in the present embodiment. The opposing rotators 40 take the form of a disc and have coincident central hole 50.

The opposing rotators 40 each have on an inner surface thereof a cylindrical pan-like recess 51 communicating to the central hole 50, which is a center of the recess 51, and a plurality of raised portions 52 provided on the bottom 51a of the recess 51 and extending radially outwardly from the central hole 50. The raised portions 52 are low in height compared to the depth of the pan-like recess 51 and increase gradually in lateral width from the center portion thereof to the outer portion thereof, but are not limited to this particular configuration. The opposing pan-like recesses 51 constitute the operating chamber 42 in association with each other.

The rotators 40 have the corresponding continuous flanges 53 extending along the outer peripheries thereof over which flanges 53 a connection ring 48 is fitted to slidably guide the rotators 40 on rotation thereof in the opposite directions against each other and to hold the rotators 40 at a predetermined spacing. The connection ring 48 includes a pair of ring halves removably held at ends by fixing members 54. The connection ring 48 may include three or more equal arcuate segments.

The shaft 41 extends through a sleeve 56 received in the aligning central holes 50 in the rotators 40. The shaft 41 includes a bolt 57 the stem of which is passed through the sleeve 56 and a nut 58 tightened on the bolt 57 for fastening purposes.

Enclosed within the operating chamber 42 are the combining layer 43, plasticity deformation member 44 and rubber or elastic ring 46.

In greater detail, rubber or elastic ring 46 is disposed along the peripheries of the opposing pan-like recesses 51 in the rotators 40 and the combining layer 43 and the plasticity deformation member 44 are filled into a spacing formed between the elastic ring 46 and sleeve 56. The rubber or elastic ring 46 is fixedly bonded to the rotators 40 with an adhesive so as to permit the rotators 40 to return its initial position by the elastic recovering force of the rubber ring 46.

The combining layer 43 made of Pb-Sn alloy and plastic deformation member 44 made of Pb are filled into the space defined by the inner annular surface of the rubber or elastic ring 46 and partitioned with the boundary surfaces 45 in the operating chamber 42. The bonding strength between the combining layers 43 and the plastic deformation member 44 in the boundary surfaces 45 in the present embodiment is larger than the plasticity yield stress of the plastic deformation member 44.

The material for the combining layers 43 is filled so as to have a thickness enough to cause the raised portions 52 on the opposing pan-like recess bottoms 51a to be embedded, plastic deformation material 44 being provided between the combining layers 43.

In the link mechanism 47, two links 60 and 61 are provided at symmetrical positions around the central rotational shaft 41 on an outer surface of one of the rotators 40 in the vicinity of the outer periphery of the rotator 40 such that the respective links 60 and 61 are rotatably mounted around pivots 62 and 63. Two further links 65 and 66 are also provided at symmetrical positions around the central rotational shaft 41 on an outer surface of another rotator 40 in the vicinity of the outer periphery of the other rotator 40 such that the links 65 and 66 are perpendicular to the links 60 and 61 that the links 65 and 66 are rotatably around the pivots 67 and 68, respectively. These pivots 62, 63, 67 and 68 are fixedly embedded in the corresponding rotators 40.

These links 60, 61, 65 and 66 are connected to each other by pivots 70, 71, 72 and 73 so as to form a link mechanism; namely, the links 60 and 65 are connected by the pivot 70; the links 60 and 66 by the pivot 71; the links 61 and 65 by the pivot 72; and the links 61 and 66 by the pivot 73. Thus, the four links 60, 61, 65 and 66 forms a 4-node chain ring. Each of the pivots 70-73 is kept rotatably in a sleeve 75 to which a member 77 is used to connect the rotator to an inclined member of the building concerned is fixed.

The operation of the energy absorption apparatus T of the present embodiment, thus constructed, is as follows:

When the opposing connecting member 77A and 77B receive compression and tension alternately, the 4-nod chain including links 60, 61, 65 and 66 is deformed to thereby rotate the two rotators 40 in opposite directions.

A relative displacement between the rotators 40 caused by opposite rotations is transmitted to the plastic deformation member 44 through the combining layers 43 connected to the rotators 40 so as to rotate together with the rotators 40 by means of the raised portions 52 provided on the pan-like recess bottoms 51a to thereby cause pure shearing deformation in the plastic deformation member 44.

The rotation energy of the rotators 40 is absorbed due to the energy consumption involving the plastic deformation so that the periodic motion of the buildings connected to the apparatus T is attenuated, as mentioned above with reference to the previous embodiment.

Since in the energy absorption apparatus T the plastic deformation member 44 receives plastic deformation force on both sides, it exhibits great energy absorption performance. In addition, it realizes pure shearing deformation in the plastic deformation member 44, so that it provides a stablilized energy absorption characteristic.

Figure 8:
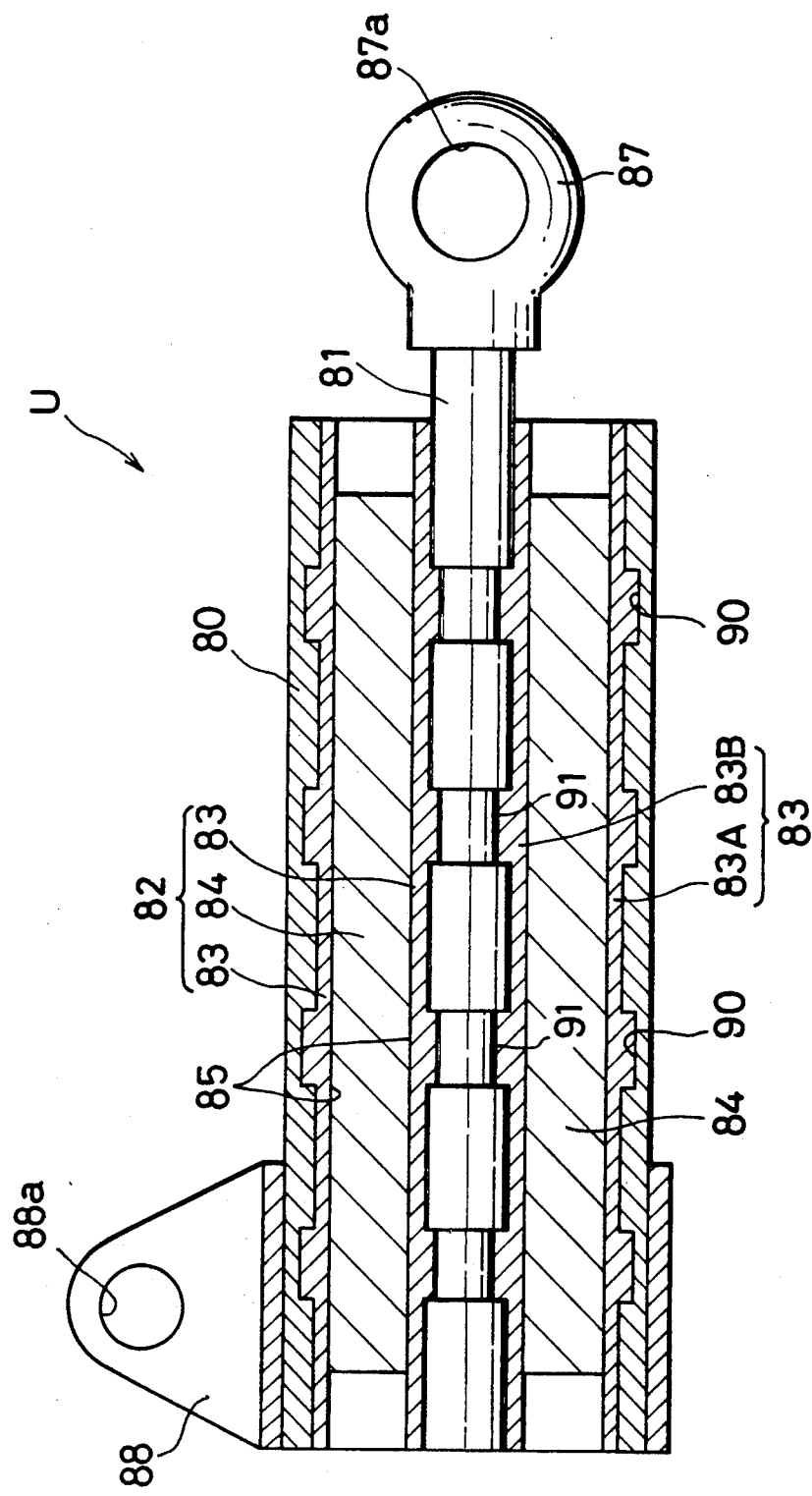
FIG. 8 is a longitudinally cross-sectional view of a still further embodiment.

A still further embodiment of the present invention will be described with reference to FIG. 8 in which an energy absorption apparatus U includes a tubular housing or cylinder 80, a cylindrical rod 81 extending along the axis of the cylinder 80 and having an exposed end 81, and a plastic deformation member 84 filled between concentric tubular combining layers 83 in the operating chamber 82 which is annular space defined by the cylinder 80 and the rod 81. Brackets 87 and 88 are attached to the exposed rod end 81 and an end of the cylinder 80 remote from the exposed rod and 81, respectively.

In the present embodiment, the cylinder 80 and the rod 81 are the first and second operating means, respectively. More specifically, the cylinder 80 has grooves 90 provided at predetermined intervals axially on its inner surface to form a continuously raised and recessed inner surface while the rod 81 has grooves 91 provided at predetermined intervals axially to thereby provide a continuously raised and recessed outer surface.

The plastic deformation member 84 made of Pb is filled into the space between a combining layer 83A made of Pb-Sn alloy disposed on the inner surface of the cylinder 80 a combining layer 83B disposed on the outer surface of the rod 81 within the operating chamber 82 with the boundary surfaces 85. The bonding strength between the combining layer 83A, 83B and the plastic deformation member 84 at the boundary surface 85 is larger than the plasticity yield stress of the plastic deformation member 84.

The brackets 87 and 88 have connection eyes 87a and 88a, respectively, through which the cylinder 80 and rod 81 are connected to the corresponding structures which may be displaced relative to each other.

If the structures are displaced relative to each other, a relative axial displacement occurs between the cylinder 80 and the rod 81 in the present energy absorption apparatus U and is transmitted to the plastic deformation member 84 through the combining layers 83A and 83B combined with the grooves 90 and 91 on the cylinder 80 and rod 81, respectively, to thereby cause pure shearing plastic deformation in the plastic deformation member 84.

By this energy consumption involving the shearing deformation, the relative movement between the cylinder 80 and the rod 81 is absorbed to thereby attenuate the periodic motion of the buildings with the apparatus U as in the previous two embodiments.

In the energy absorption apparatus U, the pure shearing plastic deformation occurs in the plastic deformation member 84, so that stabilized energy absorption characteristic is achieved at all times. In addition, the plastic deformation member 84 is provided between the concentric cylindrical boundary surfaces 85 to thereby ensure a large-capacity pure shearing plastic deformation region and hence miniaturization of the apparatus.

According to the energy absorption apparatus of the present invention, the causes of fluctuations due to plastic deformation are eliminated and a pure shearing plastic deformation is achieved in the plastic deformation member to thereby exhibit an energy absorption characteristic stabilized at all times and greatly improve energy absorption performance under small amplitude vibration.

What is claimed is:

1. An energy absorption apparatus disposed between a pair of structures which are movable relative to each other, comprising:
   a first operating means connected to one of the structures;
   a second operating means connected to the other structure;
   at least one of said first and second operating means having a raised portion on a surface thereof opposite to the other operating means;
   a plastic deformation member made of a superplastic material provided between the first and second operating means and subjected to plastic deformation depending on a relative displacement between the first and second operating means;
   a combining layer provided between said one operating means and said plastic deformation member and having a plastic yield stress larger than said plastic deformation member, the bonding strength between said combining layer and said plastic deformation member being larger than the plasticity yield stress of said plastic deformation member.

2. An energy absorption apparatus according to claim 1, wherein said combining layer has a thickness enough to cover at least a top of said raised portion of said one operating means.

3. An energy absorption apparatus according to claim 1 wherein said superplastic material is lead and said combining layer is made of lead alloy.

4. An energy absorption apparatus according to claim 3, wherein said lead alloy is lead-tin alloy.

5. An energy absorption apparatus according to claim 1 wherein said superplastic material is an alloy, and said combining layer is made of an alloy of the same kind as the superplastic material.

6. An energy absorption apparatus according to claim 5, wherein said superplastic mateial is an alloy selected from a group consisting of a lead alloy, tin alloy, silver alloy, aluminum alloy, copper alloy and zinc alloy.

7. An energy absorption apparatus according to claim 1 wherein said superplastic material is an alloy, and said combining layer is made of a metal which is a main component of the alloy of the superplastic material.

* * * * *